Aug. 23, 1960 W. D. MOEHRING 2,950,355

MAGNETIC HEAD ASSEMBLY

Filed June 11, 1958

INVENTOR.
William D. Moehring

BY Otto A. Earl
ATTORNEY.

United States Patent Office 2,950,355

Patented Aug. 23, 1960

2,950,355

MAGNETIC HEAD ASSEMBLY

William D. Moehring, P.O. Box 105, Vermontville, Mich.

Filed June 11, 1958, Ser. No. 741,403

10 Claims. (Cl. 179—100.2)

This invention relates to improvements in erase head for magnetic tapes. The principal objects of this invention are:

First, to provide an erase head structure which can be manufactured and assembled to a high degree of dimensional tolerances with a minimum of time and effort.

Second, to provide an erase head in which the position of the magnetic parts which coact with the tape is automatically determined by the preformed shape of the manetic parts which can be accurately formed to size and shape by a simple stamping operation.

Third, to provide an erase head in which the magnetizable core that coacts with the tape is located accurately and simply relative to a magnetically conductive return path by forming a locating slot or opening in a holding member of magnetizable material so that the holding member functions both as a locater and a magnetic return element for the core.

Other objects and advantages of the invention will be apparent from a consideration of the following description and claims. The drawings, of which there is one sheet, illustrates a highly practical form of the erase head structure.

Figure 1:
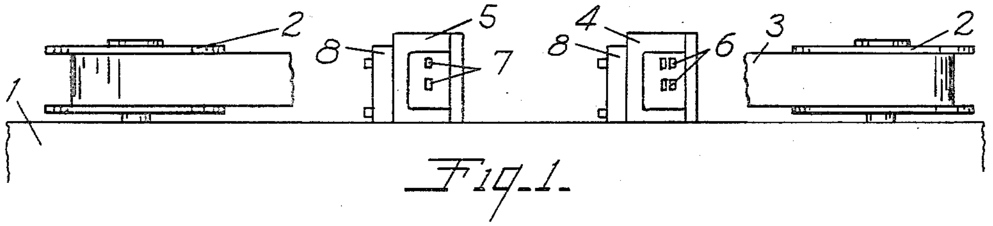
Fig. 1 is a fragmentary elevational view conventionally illustrating a magnetic tape recording and reproducing machine with an erase head such as is covered by the invention associated therewith.

In magnetic tape recording and reproducing machines it is common to provide a structure known as an erase head to remove or neutralize magnetic alignments and arrangements that may exist in the magnetic tape prior to rerecording a new pattern of magnetic arrangements on the tape. Fig. 1 illustrates conventionally a magnetic recording or reproducing machine 1 having a pair of spools 2 for winding up and paying out the magnetizable tape 3. In passing from one spool to the other, the tape is translated across a recording or reproducing head 4 and an erase head 5. The recording or reproducing head 4 includes one or more pairs of pole pieces 6 defining a magnetic gap, two pairs of pole pieces being shown in the assembly illustrated. The pairs of pole pieces operate on spaced areas or tracks of the tape so that in reality the tape 3 provides plural magnetic tracks. When the magnetic element in any track on the tape is to be obliterated, one or more of the magnitizable cores 7 in the erase head is actuated to neutralize the magnetic element in the track with which the core is in contact.

The principles of magnetizing and erasing magnetic tapes are well known but it is pointed out that it is now common practice to utilize four distinct tracks in a single magnetic tape so that accurate positioning of the pole pieces 6 and the cores 7 is essential so that these elements will coact with the desired track on the tape without effecting the magnetic element in closely adjacent tracks. The spacing of the tracks on the tapes is so small as to require extreme accuracy in physically locating the pole tips 6 and the cores 7. To this end the recording head 4 and erase head 5 are secured to suitable supports 8 on the recording machine. For the purposes of description the erase head 5 will be considered as mounted on its side.

Figures 2, 3, 4, 5:
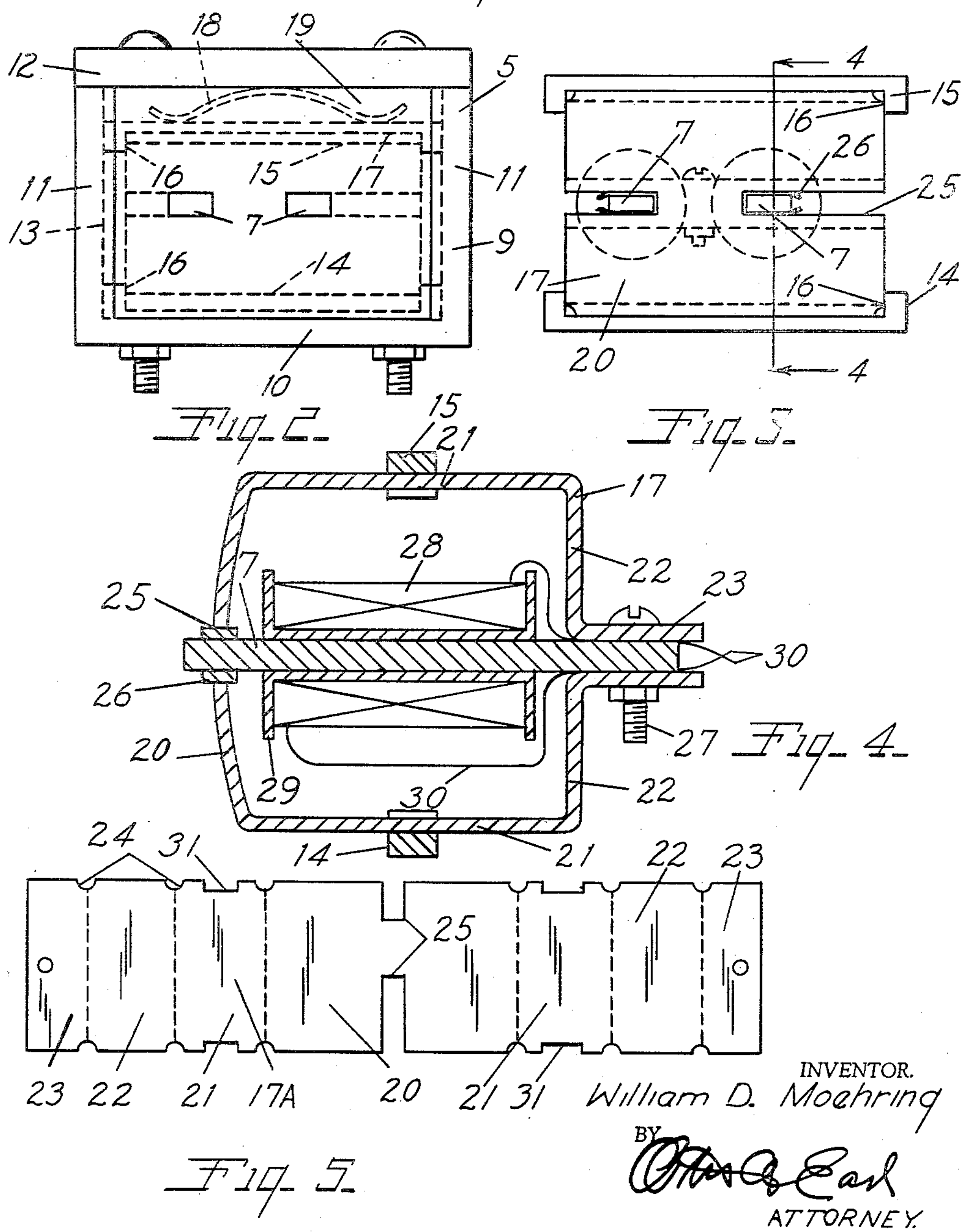
Fig. 2 is an enlarged front elevational view of the erase head of the invention.
Fig. 3 is an enlarged front elevational view of the magnetic structure mounted in the head of Figs. 1 and 2.
Fig. 4 is an enlarged fragmentary vertical cross sectional view taken along the plane of the line 4—4 in Fig. 3.
Fig. 5 is a plan view of the blank form from which the holder shown in Figs. 3 and 4 is formed.

As appears more clearly in Fig. 2 the erase head 5 consists of a box-like case 9 having a bottom wall 10 and upright side walls 11 with an open front face. A cover 12 closes the top of the case. Within the case the side walls 11 are provided with opposed upright locating slots 13 which receive and locate the ends of a lower retaining bar 14 and an upper retaining bar 15. The retaining bars 14 and 15 are shaped with locating notches 16 in their opposed surfaces to receive and locate a holder 17. The holder in turn supports the magnetizable cores 7 in a manner which will be described in greater detail presently.

A bowed spring 18 positioned between the top 12 of the case and the upper retaining bar 15 initially holds the parts in position in the case. A filler of solidified plastic material such as a thermo-setting resin fills the case around the holder and the spring as at 19 and after the filler has hardened the exposed face of the filler and the magnetizable cores 7 are finished to a smooth surface over which the tape 3 is translated.

The holder 17 for the magnetic core bars 7 is more particularly illustrated in Figs. 3, 4 and 5. It consists of a strip of easily magnetized material such as nickel, iron and is formed from a blank of the material 17A shown in Fig. 5. The strip is folded into a front wall 20, side walls 21, two converging rear walls 22 and rearwardly turned end portions 23 at the back of the holder. If desired the upper and lower edges of the blank 17A can be notched as at 24 to predetermine the lines on which the blank will fold to form the several walls. The front wall 20 is notched or slit from its upper and lower edges as at 25 and the width of the slits 25 are accurately controlled by the punch with which they are formed to be slightly wider than the thickness of the magnetizable cores 7. The depth of the slits from the edges of the blank is also accurately controlled to locate the position of the magnetic cores 7 laterally in the holder as viewed in Figs. 2 and 3 and vertically in the assembled head 5 as shown in Fig. 1.

After the blank 17 is folded into box-like shape the core bars 7 are slipped transversely into the slits 25 with the rear ends of the bars projecting between the spaced rear ends 23 of the holder. A non-magnetizable material such as a thin sheet of copper or paper 26 is wrapped around the forward end of each core bar where it fits into the slit 25 to form a magnetic gap between the core bar and the holder. The rear ends of the core bars are clamped in direct magnetic contact with the rearwardly turned ends 23 of the holder by suitable means such as the screw 27. Welding or adhesive may be substituted for the screw. Before being assembled in the holder each core bar 7 has an electro-magnet coil 28 wound on a spool 29 slipped thereover. The ends of the coil are extended in lead wires 30 for connection to energizing circuits in any suitable fashion.

The edges of the side walls 21 may be provided with locating notches 31 that are sized to receive the width of the retaining bars 14 and 15 in the case to locate the holder from front to rear of the head 5. The previously described notches 16 in the retaining bars locate the holder transversely of the head and the depth of the slits 25 accurately locate the position of the core bars 7 in the head. In the example illustrated the short slit 25 is designed to locate one core 7 opposite the top track of the tape while the long slit 25 locates the other core opposite the third track on the tape. By inverting the holder 17 in the head the core bars can be made to coact with the second and fourth tracks on the tape. Other spacings or locations for the core bars can be accurately predetermined by varying the depth of the slits 25. The width of the core bars 7 is controlled by accurately regulating the width of the pieces as they are sheared or punched from a strip of stock and it is unnecessary to control the length of the core bars to any particular length as it is only necessary that the bars extend for a substantial distance between the ends 23 of the holder for good magnetic contact and they project forwardly from the front wall 20 of the holder. As previously noted the projecting front ends are ground or finished into smooth flush relation with the filler in the head 5. All of the critical tolerances and locations are predetermined by the size and shape of the parts which can be easily controlled and accurately reproduced in stamping operations. Erase heads assembled in this manner will therefore have a high degree of uniformity and accuracy of core bar positions.

Having thus described the invention, what is claimed as new and desired to secure by Letters Patent is:

1. An erase head assembly for magnetic tapes comprising a case having an open end and top with side walls extending from a bottom wall, opposed parallel upright slots in the inside of said side walls, spaced retaining bars having their ends located in said slots with the bottom bar supported on the bottom of the case, opposed notches formed in the opposed sides of said bars, a holder consisting of a strip of thin magnetic iron folded into box shape with front, side and back walls and spaced rearwardly projecting parallel ends on the inner ends of said back walls, opposed locating notches formed in the upper and lower edges of said front wall, magnetic core bars having their front ends received in said notches in said front wall and having their rear ends extended across said holder to between said rearwardly projecting ends, means holding said rearwardly projecting ends of said strip in magnetic contact with the rear ends of said cores, thin non-magnetic separator sheets disposed around the front ends of said cores in the slots in said front wall, electromagnet coils disposed around said cores and electrically insulated therefrom, the side walls of said holder being received between said retaining bars and located by the notches therein, said side walls of said holder having notches formed therein engaging the sides of said bars to locate said holder from front to rear of said case, a cover on the open top of said case, yieldable means disposed between said cover and the top bar, and a filler solidified in situ in said case around said holder and coils, the exposed surface of said filler and the front ends of said cores being finished to a smooth surface.

2. An erase head assembly for magnetic tapes comprising a case having an open end and top with side walls extending from a bottom wall, opposed locating surfaces on the inside of said side walls, spaced retaining bars having their ends located by said surfaces with the bottom bar supported on the bottom of the case, opposed notches formed in the opposed sides of said bars, a holder consisting of a strip of thin magnetic material folded into box shape with front, side and back walls and spaced rearwardly projecting parallel ends on the inner ends of said back walls, opposed locating notches formed in the upper and lower edges of said front wall, magnetic core bars having their front ends received in said notches in said front wall and having their rear ends extended across said holder to between said rearwardly projecting ends, means holding said rearwardly projecting ends of said strip in magnetic contact with the rear ends of said cores, thin non-magnetic separator sheets disposed around the front ends of said cores in the slots in said front wall, electro-magnet coils disposed around said cores and electrically insulated therefrom, the side walls of said holder being received between said retaining bars and located by the notches therein, a cover on the open top of said case, yieldable means disposed between said cover and the top bar, and a filler solidified in situ in said case around said holder and coils, the exposed surface of said filler and the front ends of said cores being finished to a smooth surface.

3. An erase head assembly for magnetic tapes comprising a case having an open end with side walls extending from a bottom wall, opposed locating surfaces on the inside of said side walls, spaced retaining bars having their ends located by said surfaces with the bottom bar supported on the bottom of the case, a holder consisting of a strip of thin magnetic material folded into box shape with front, side and back walls and spaced rearwardly projecting parallel ends on the inner ends of said back walls, the front wall being located across said open end of said case, opposed locating notches formed in the upper and lower edges of said front wall, magnetic core bars having their front ends received in said notches in said front wall and having their rear ends extended across said holder to between said rearwardly projecting ends, means holding said rearwardly projecting ends of said strip in magnetic contact with the rear ends of said cores, thin non-magnetic separator sheets disposed around the front ends of said cores in the slots in said front wall, electro-magnet coils disposed around said coils and electrically insulated therefrom, the side walls of said holder being interlockingly engaged with said retaining bars and located thereby, and a filler solidified in situ in said case around said holder and coils, the exposed surface of said filler and the front ends of said cores being finished to a smooth surface.

4. An erase head for magnetic tapes comprising a holding element of thin strip-like magnetic material folded into a loop with spaced parallel ends turned outwardly of the loop, slits formed in the edges of said strip and alined thereacross at the opposite side of the loop from said ends, core bars of magnetic material each having one end located by the ends of said slits and having their other ends extending between said ends of said strip, means holding said ends of said strip in magnetic contact with the ends of said bars, means forming a thin magnetic gap between the ends of said bars and the edges of said slits, and electro-magnet coils positioned around said bars within said loop, the edges of said strip having locating projections formed thereon at the sides of said loop.

5. An erase head for magnetic tapes comprising a holding element of thin strip-like magnetic material folded into a loop with spaced parallel ends turned outwardly of the loop, slits formed in the edges of said strip and alined thereacross at the opposite side of the loop from said ends, core bars of magnetic material each having one end located by the ends of said slits and having their other ends extending between said ends of said strip, means holding said ends of said strip in magnetic contact with the ends of said bars, means forming a thin magnetic gap between the ends of said bars and the edges of said slits, and electro-magnet coils positioned around said bars within said loop, the edges of said strip having locating projections formed thereon.

6. An erase head for magnetic tapes comprising a holding element of thin strip-like magnetic material folded into a loop with spaced parallel ends turned outwardly of the loop, slits formed in the edges of said strip and alined thereacross at the opposite side of the loop from said ends, core bars of magnetic material each having one end located by the ends of said slits and having their other ends extending between said ends of said strip, means holding said ends of said strip in magnetic contact with the ends of said bars, means forming a thin magnetic gap between the ends of said bars and the edges of said slits, and electro-magnet coils positioned around said bars within said loop.

7. An erase head assembly for magnetic tapes comprising a holder consisting of a strip of thin magnetic material folded into box shape with front, side and back walls and spaced rearwardly projecting parallel ends on the ends of said back walls, a locating notch formed in one edge of said front wall, a magnetic core bar having its front end received in said notch in said front wall and located against the bottom of the notch with its rear end extending across said holder to between said rearwardly projecting ends, means holding said rearwardly projecting ends of said strip in magnetic contact with the rear end of said core, thin non-magnetic separator means disposed around the front end of said core in the slot in said front wall, an electro-magnet coil disposed around said core and electrically insulated therefrom, and a filler solidified in situ around said holder and coils.

8. An erase head assembly for magnetic tapes comprising a holder consisting of a strip of thin magnetic material folded into box shape with front, side and back walls and spaced rearwardly projecting parallel ends on the ends of said back walls, a locating notch formed in one edge of said front wall, a magnetic core bar having its front end received in said notch in said front wall and located against the bottom of the notch with its rear end extended across said holder to between said rearwardly projecting ends, means holding said rearwardly projecting ends of said strip in magnetic contact with the rear end of said core, thin non-magnetic separator means disposed around the front end of said core in the slot in said front wall, and an electro-magnet coil disposed around said core and electrically insulated therefrom.

9. An erase head assembly for magnetic tapes comprising a holder consisting of a strip of magnetizeable material folded into box shape with front, side and back walls and spaced rearwardly projecting parallel ends on the ends of said back walls, a locating notch formed in one edge of said front wall, a magnetic core bar having its front end received in said notch in said front wall and having its rear end extended across said holder to between said reardwardly projecting ends, means holding said rearwardly projecting ends of said strip in magnetic contact with the rear end of said core, thin non-magnetic separator means disposed around the front end of said cores in the slot in said front wall, and an electro-magnet coil disposed around said core and electrically insulated therefrom, said side walls of said holder having notches formed therein.

10. An erase head for magnetic tapes comprising a holding element of thin strip-like magnetic material folded into a loop with spaced ends turned outwardly of the loop, a slit formed in the edge of said strip at the opposite side of the loop from said ends, a core bar of magnetic material having one end located by the end of said slit and having its other end extending between said ends of said strip, means holding said ends of said strip in magnetic contact with the end of said bar, means forming a thin magnetic gap between the end of said bar and the edges of said slit, and an electro-magnet coil positioned around said bar within said loop.

References Cited in the file of this patent

UNITED STATES PATENTS

| | | |
|---|---|---|
| 2,590,292 | Anderson | Mar. 25, 1952 |
| 2,813,932 | Kornei | Nov. 19, 1957 |
| 2,861,134 | Gernert | Nov. 18, 1958 |